(12) United States Patent
Mok et al.

(10) Patent No.: US 11,553,171 B2
(45) Date of Patent: Jan. 10, 2023

(54) LIGHT FIELD DISPLAY DEVICE AND METHOD OF PROCESSING IMAGE OF THE SAME

(71) Applicant: SAMSUNG DISPLAY CO., LTD., Yongin-si (KR)

(72) Inventors: Rang Kyun Mok, Yongin-si (KR); Jae Joong Kwon, Yongin-si (KR); Beom Shik Kim, Yongin-si (KR); Jeong Woo Park, Yongin-si (KR); Su Bin Jung, Yongin-si (KR); Hyun Jin Cho, Yongin-si (KR); Young Sang Ha, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/347,675

(22) Filed: Jun. 15, 2021

(65) Prior Publication Data

US 2022/0078398 A1 Mar. 10, 2022

(30) Foreign Application Priority Data

Sep. 4, 2020 (KR) .................. 10-2020-0113389

(51) Int. Cl.
*H04N 13/279* (2018.01)
*H04N 13/32* (2018.01)
*H04N 13/383* (2018.01)

(52) U.S. Cl.
CPC .......... *H04N 13/279* (2018.05); *H04N 13/32* (2018.05); *H04N 13/383* (2018.05)

(58) Field of Classification Search
None
See application file for complete search history.

(56) References Cited

U.S. PATENT DOCUMENTS

| 10,120,194 | B2 | 11/2018 | Cobb et al. |
| 10,746,990 | B2 | 8/2020 | Park et al. |
| 2017/0108697 | A1* | 4/2017 | El-Ghoroury ...... G02B 27/0093 |
| 2017/0235372 | A1* | 8/2017 | Song ................... G03H 1/024 345/158 |

(Continued)

FOREIGN PATENT DOCUMENTS

| KR | 10-2019-0016869 | 2/2019 |
| KR | 10-2019-0118846 | 10/2019 |

*Primary Examiner* — Talha M Nawaz
(74) *Attorney, Agent, or Firm* — F. Chau & Associates, LLC

(57) ABSTRACT

A light field display device includes: a display module; an optical coupler emitting a third image obtained by combining a first image and a second image, and including a first surface, a second surface and an emission surface emitting the third image, wherein the first image is emitted from the display module and is incident on the first surface, wherein the second image is incident on the second surface; and a controller configured to generate image data based on 3D modeling data and provide the image data to the display module. The optical coupler includes: an optical waveguide including the first, second and emission surfaces, and a third surface; a beam splitter in the optical waveguide; and a concave mirror adjacent to the third surface of the optical waveguide, and wherein the controller moves the concave mirror in correspondence with depth information included in the 3D modeling data.

17 Claims, 13 Drawing Sheets

(56) References Cited

U.S. PATENT DOCUMENTS

| | | |
|---|---|---|
| 2019/0049732 A1 | 2/2019 | Lee et al. |
| 2020/0126303 A1 | 4/2020 | Kim et al. |
| 2021/0302758 A1* | 9/2021 | Smithwick ............ G03B 21/006 |
| 2022/0078398 A1* | 3/2022 | Mok ....................... G02B 30/26 |

* cited by examiner

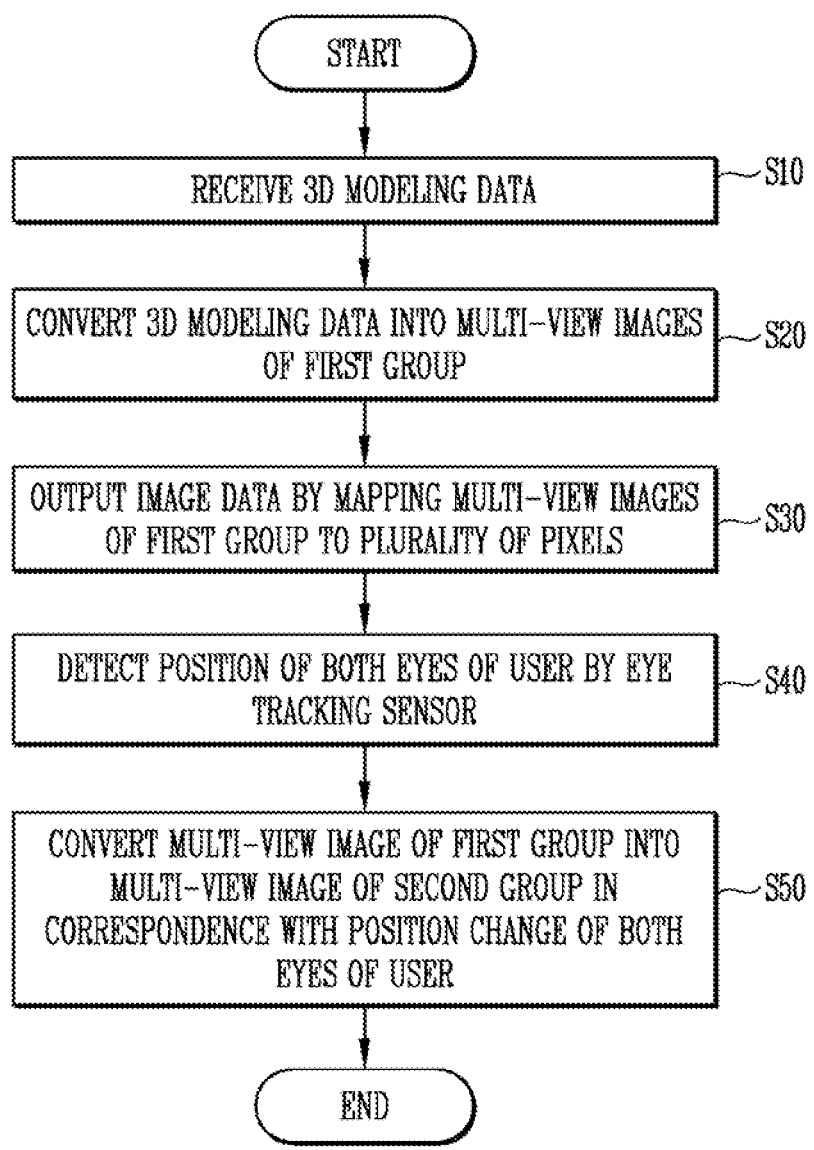

LIGHT FIELD DISPLAY DEVICE AND METHOD OF PROCESSING IMAGE OF THE SAME

CROSS-REFERENCE TO RELATED APPLICATION

This application claims priority under 35 U.S.C. § 119 to Korean Patent Application No. 10-2020-0113389, filed in the Korean Intellectual Property Office on Sep. 4, 2020, the disclosure of which is incorporated by reference herein in its entirety.

TECHNICAL FIELD

The present invention relates to a light field display device and a method of processing an image of the light field display device.

DISCUSSION OF THE RELATED ART

Typically, a three-dimensional display device that displays different images to each eye of a person may include a glasses type method and a non-glasses type method. The glasses type method is, generally, a method of filtering a desired image by using division with polarized light, time division, wavelength division with different primary color wavelengths, and the like. In addition, the non-glasses type method is, generally, a method in which each image may be viewed only in a specific space by using a parallax barrier or a lenticular lens.

For example, among the non-glasses type methods, there is also a method of reproducing a light field. The light field refers to a distribution of a light ray coming from an object for each position or direction. When such a light field is optically reproduced on a surface, a user positioned behind such a surface may experience the same light ray distribution as when an actual object exists, and thus a three-dimensional image of a natural object may be viewed.

As described above, generally, the method of reproducing the light field may refer to a method of reproducing a light ray output in various directions by points existing in a certain space through the display device.

SUMMARY

According to an embodiment of the present invention, a light field display device including: a display module; an optical coupler configured to emit a third image obtained by combining a first image and a second image, and including a first surface, a second surface and an emission surface facing the second surface and emitting the third image, wherein the first image is emitted from the display module and is incident on the first surface, wherein the second image is emitted from a path different from a path of the first image, and wherein the second surface is disposed substantially perpendicular to the first surface and the second image is incident thereon; and a controller configured to generate image data based on 3D modeling data and provide the image data to the display module. The optical coupler includes: an optical waveguide including the first surface, the second surface, the emission surface, and a third surface facing the first surface; a beam splitter disposed in the optical waveguide; and a concave mirror disposed adjacent to the third surface of the optical waveguide, and wherein the controller moves the concave mirror up and down with respect to the third surface in correspondence with depth information included in the 3D modeling data.

In an embodiment of the present invention, when a depth value included in the depth information is greater than a reference depth value, the controller moves the concave mirror downward from the third surface in correspondence with a difference between the depth value and the reference depth value.

In an embodiment of the present invention, the first image is displayed on the second surface when the depth value is the same as the reference depth value, and wherein the first image is displayed in an area adjacent to the beam splitter when the 3D modeling data has the depth value greater than the reference depth value.

In an embodiment of the present invention, the beam splitter is a half mirror.

In an embodiment of the present invention, the light field display device further includes: a plurality of polarizing plates including: a first polarizing plate disposed on the first surface; and a second polarizing plate disposed on the emission surface and having a polarization axis substantially perpendicular to a polarization axis of the first polarizing plate.

In an embodiment of the present invention, the light field display device further includes: a ¼ wave plate disposed between the third surface and the concave mirror.

In an embodiment of the present invention, the light field display device further includes: a third polarizing plate disposed on the second surface and having a polarization axis substantially parallel to the polarization axis of the second polarizing plate.

In an embodiment of the present invention, the display module includes: a display panel including a plurality of pixels; and a micro lens array disposed on the display panel and including a plurality of micro lenses.

In an embodiment of the present invention, a pitch of the plurality of micro lenses is designed so that a field of view of a basic field of view section becomes about 6°.

In an embodiment of the present invention, the light field display device further includes: an eye tracking sensor configured to track a position of both eyes of a user.

In an embodiment of the present invention, the controller includes: a multi-view image generator configured to convert the 3D modeling data into a multi-view image of a first group by multi-view virtual cameras; and a graphic processor configured to map the multi-view image of the first group to the plurality of pixels.

In an embodiment of the present invention, at least two or more multi-view virtual cameras are disposed to correspond to each eye of the user.

In an embodiment of the present invention, a plurality of sub field of view sections are included on left and right sides of the basic field of view section, and each of the sub field of view sections has a field of view corresponding to half of the basic field of view section.

In an embodiment of the present invention, a field of view of an expansion field of view section including the basic field of view section and the plurality of sub field of view sections is about 5 to about 10 times the field of view of the basic field of view section.

In an embodiment of the present invention, the multi-view image generator converts the 3D modeling data into multi-view images of a second group different from the multi-view image of the first group by changing a position of the multi-view virtual cameras in correspondence with a position change of the both eyes of the user detected by the eye tracking sensor.

In an embodiment of the present invention, the multi-view image generator converts the 3D modeling data into multi-view images of a second group different from the multi-view image of the first group by calculating a distance between the user and the eye tracking sensor and by changing a distance between the multi-view virtual cameras in correspondence with the calculated distance.

In an embodiment of the present invention, when the calculated distance between the user and the eye tracking sensor increases, the multi-view image generator increases the distance between the multi-view virtual cameras, and when the calculated distance between the user and the eye tracking sensor decreases, the multi-view image generator decreases the distance between the multi-view virtual cameras.

In an embodiment of the present invention, a method of processing an image of a light field display device includes: receiving 3D modeling data; converting the 3D modeling data into a multi-view image of a first group by multi-view virtual cameras; outputting image data by mapping each of the multi-view images of the first group to a plurality of pixels of a display module of the light field display device; detecting a position of both eyes of a user by an eye tracking sensor of the light field display device; and converting the 3D modeling data into multi-view images of a second group different from the multi-view image of the first group by changing a position of the multi-view virtual cameras in correspondence with a detected position change of the both eyes of the user.

In an embodiment of the present invention, the display module includes a display panel including the plurality of pixels, and a micro lens array disposed on the display panel and including a plurality of micro lenses, and wherein a pitch of the plurality of micro lenses is designed so that a field of view of a basic field of view section becomes about 6°.

In an embodiment of the present invention, the method further includes: calculating a distance between the user and the eye tracking sensor; and converting the 3D modeling data into multi-view images of a third group different from the multi-view image of the second group by changing the distance between the multi-view virtual cameras in correspondence with the calculated distance.

BRIEF DESCRIPTION OF THE DRAWINGS

The above and other features of the present invention will become more apparent by describing in further detail embodiments thereof with reference to the accompanying drawings, in which:

FIG. 11 is a flowchart illustrating a method of processing an image of the light field display device according to an embodiment of the present invention.

DETAILED DESCRIPTION OF THE EMBODIMENT

Figure 1:
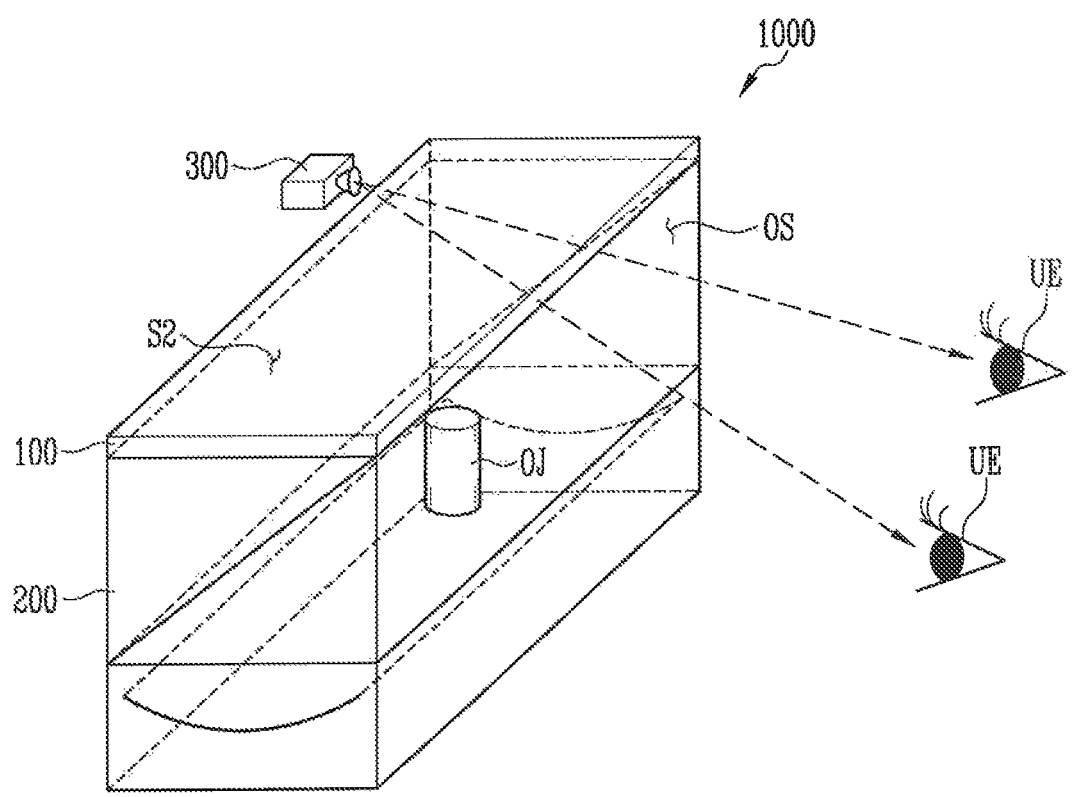
FIG. 1 is a schematic perspective view of a light field display device according to an embodiment of the present invention.

Hereinafter, an embodiment of the present invention will be described in more detail with reference to the accompanying drawings. The same reference numerals are used for the same components in the drawings, and repetitive description for the same components may be omitted.

FIG. 1 is a schematic perspective view of a light field display device according to an embodiment of the present invention.

Referring to FIG. 1, the light field display device 1000 may include a display module 100, an optical combiner 200 (e.g., an optical coupler), an eye tracking sensor 300, and a controller.

According to an embodiment of the present invention, the light field display device 1000 may provide a user UE in which a first image OJ (or, e.g., a three-dimensional object) and an external view passing through a second surface S2 and an emission surface OS of the optical coupler 200, that is, a real image (or, e.g., a second image) are combined. The first image may be generated using the display module 100 and the optical combiner 200. The first image OJ (or, e.g., the three-dimensional object) may be a virtual reality image including additional information about the real image. For example, the light field display device 1000 may be a perspective type display device in which the second surface S2 and the emission surface OS of the optical coupler 200 are transparent, and may be an augmented reality display device.

However, according to an embodiment of the present invention, the light field display device 1000 is not limited thereto, and for example, the second surface S2 of the optical coupler 200 may not transmit light, and only the first image OJ generated using the display module 100 and the optical coupler 200 may be provided to the user UE through the emission surface OS.

According to an embodiment of the present invention, the light field display device 1000 may detect a position of an eye of the user UE through an eye tracking sensor 300. The display device 1000 may reduce an inversion phenomenon and a three-dimensional effect of the first image OJ by changing a multi-view image by changing a position and a distance of a multi-view virtual camera, which is described later through FIGS. 5 to 9, in correspondence with the detected position of the eye.

The eye tracking sensor 300 may capture the user UE in real time and transmit a captured image to the controller in real time. For example, the eye tracking sensor 300 may use a web camera, a monocular camera, a stereo camera, a multi-camera, a camera capable of measuring depth information, or the like. The controller may calculate positions of left and right eyes of the user from the captured image.

The controller (refer to, e.g., FIG. 5) may include a plurality of internal units and circuits. The internal units may be directly mounted on a motherboard or mounted on a separate board that is electrically connected to the motherboard through a connector, or the like.

The controller may control an overall operation of the light field display device 1000. For example, the controller may turn on or turn off the display module 100. The controller may generate image data based on 3D modeling data and provide the generated image data to the display module 100. Here, the 3D modeling data may include coordinate information and depth information of the three-dimensional object included in the first image OJ. In addition, the controller may control an operation of an actuator included in the optical coupler 200.

Figure 2:
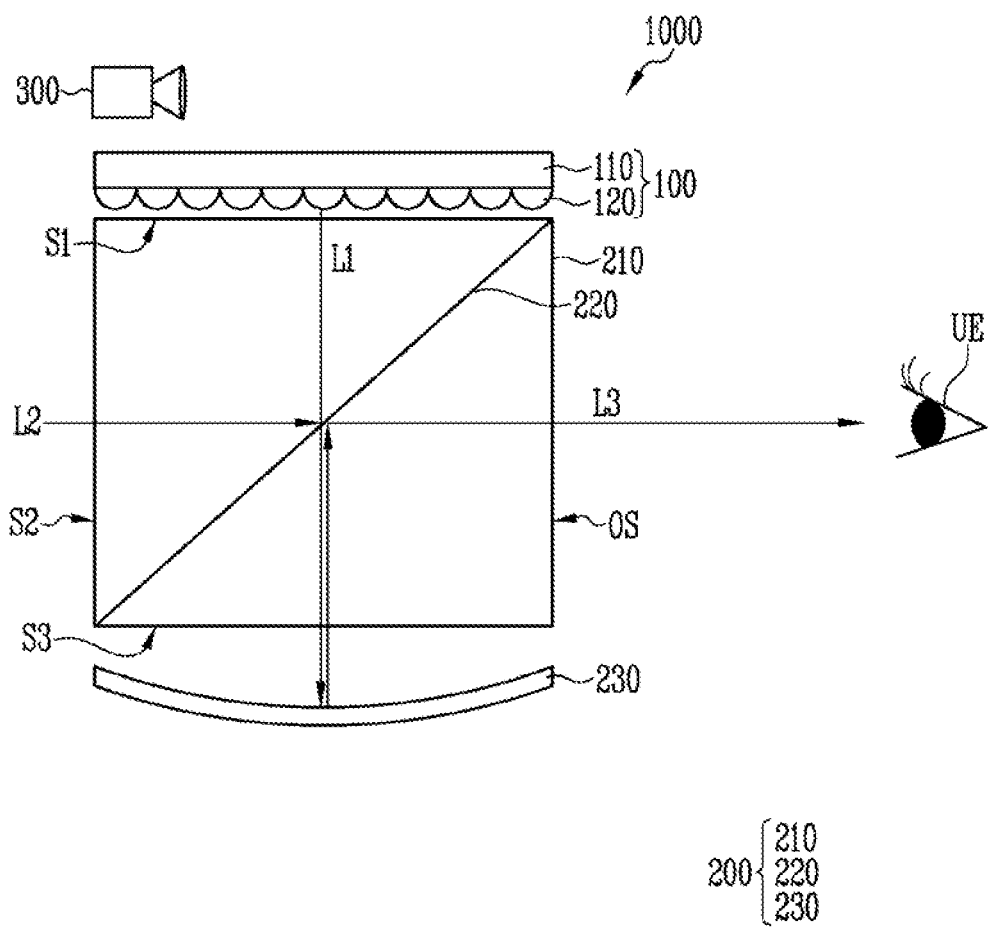
FIG. 2 is a side view of the light field display device shown in FIG. 1.
Figure 3:
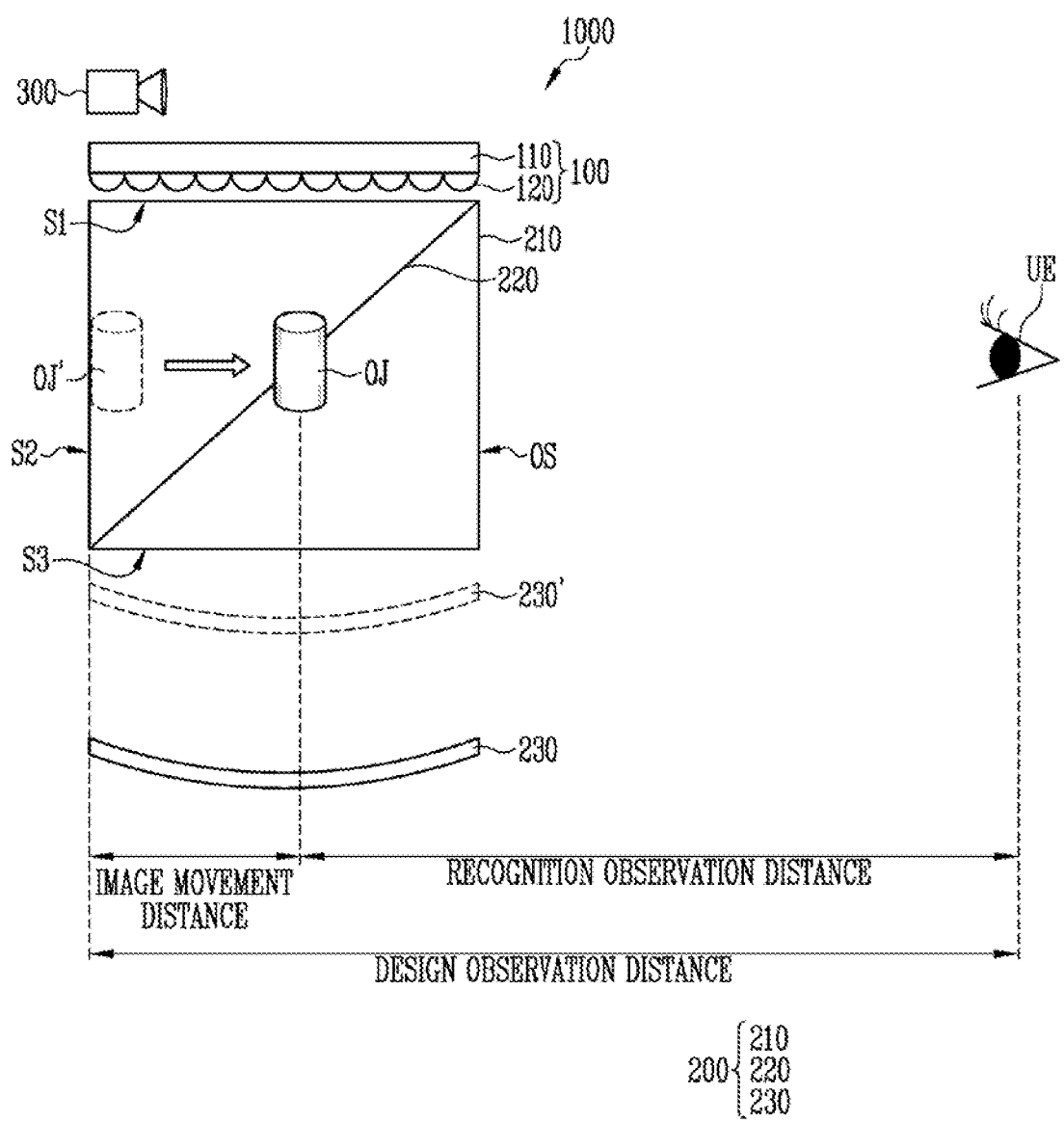
FIG. 3 is a diagram illustrating a method of driving a concave mirror according to an embodiment of the present invention.

FIG. 2 is a side view of the light field display device shown in FIG. 1. FIG. 3 is a diagram illustrating a method of driving a concave mirror according to an embodiment of the present invention.

Referring to FIGS. 1 and 2, the display module 100 modulates light according to received image data from the controller to form first light L1 for the first image OJ. For example, the first image OJ may be a two-dimensional image or a three-dimensional image, and the three-dimensional image may be a hologram image, a stereo image, a light field image, an integral photography (IP) image, or the like. In addition, the three-dimensional image may include a multi-view or super multi-view image.

The display module 100 may include, for example, a liquid crystal on silicon (LCoS) element, a liquid crystal display (LCD) element, an organic light emitting diode (OLED) element, and a digital micro mirror device (DMD). In addition, the display module 100 may include a display element such as a micro LED and a quantum dot (OD) LED. The display module 100 may include a display panel 110 and a micro lens array 120. A detailed description of the display module 100 is described later through FIGS. 4A, 4B, and 4C.

The optical combiner 200 may emit third light L3 by combining the first light L1 for the first image OJ and second light L2 for the second image. The optical combiner 200 may include the first surface S1 on which the first image OJ is incident, the second surface S2 on which the second image is incident, and the emission surface OS from which the third image combined with the first image OJ and the second image is emitted.

The optical coupler 200 may include an optical waveguide 210, a beam splitter 220 disposed in the optical waveguide 210, and a concave mirror 230. The optical waveguide 210 may have the first surface S1, the second surface S2, the emission surface OS, and a third surface S3 facing the first surface S1. In addition, the concave mirror 230 may be adjacent to the third surface S3. For example, the beam splitter 220 may be inclined with respect to the emission surface OS.

For example, the beam splitter 220 may reflect some of incident light and transmit some of the incident light, and may be a half mirror. However, the present invention is not limited thereto, and for example, a polarization beam splitter that reflects one polarized light and transmits other polarized light may be used.

The concave mirror 230 has a concave reflective surface so that the first light L1 transmitted through the beam splitter 220 passes to the concave mirror 230, and the first light L1 is reflected by the concave mirror 230 to the beam splitter 220 and is focused on a field of view of the user UE.

Referring to FIG. 3, the controller according to an embodiment of the present invention may move the concave mirror 230 up and down with respect to the third surface S3 in correspondence with the depth information included in the 3D modeling data. For example, the concave mirror 230 may be moved by an actuator controlled by the controller.

For example, when a depth value included in the depth information is greater than a reference depth value, the controller may move the concave mirror 230 downward from a reference position in correspondence with a size of a difference between the depth value included in the depth information and the reference depth value.

When the depth value included in the 3D modeling data is the same as the reference depth value, a concave mirror 230' may be disposed adjacent to the third surface S3, and a first image OJ' may be displayed on the second surface S2 of the optical waveguide 210.

As the depth value included in the 3D modeling data is greater than the reference depth value, the concave mirror 230 may be disposed farther from the third surface S3. The first image OJ may be displayed in an area adjacent to the beam splitter 220 as the size of the difference between the depth value included in the 3D modeling data and the reference depth value increases.

For example, an actuator may be provided under the concave mirror 230, and the controller may drive the actuator based on the depth information included in the 3D modeling data and the reference depth value to move the concave mirror 230', which is disposed at a position corresponding to the reference depth value, to a position corresponding to the difference between the depth value included in the depth information and the reference depth value.

As described above, the controller may adjust the disposition position of the concave mirror 230 in real time based on the depth value included in the 3D modeling data. For example, when the depth value included in the 3D modeling data is low (e.g., when displaying subtitles or the like), the controller may dispose the concave mirror 230' adjacent to the third surface S3, and when the depth value included in the 3D modeling data is high (e.g., when displaying a 3D image), the controller may dispose the concave mirror 230 to be spaced apart from the third surface S3 by a predetermined distance. As described above, since a display depth of the first image OJ is adaptively changed according to a situation, the user UE may expect an effect in which eye fatigue is reduced when viewing the image.

However, the controller may move the concave mirror 230 to a position preset by the user UE when the light field display device 1000 is turned on.

Figure 4A:
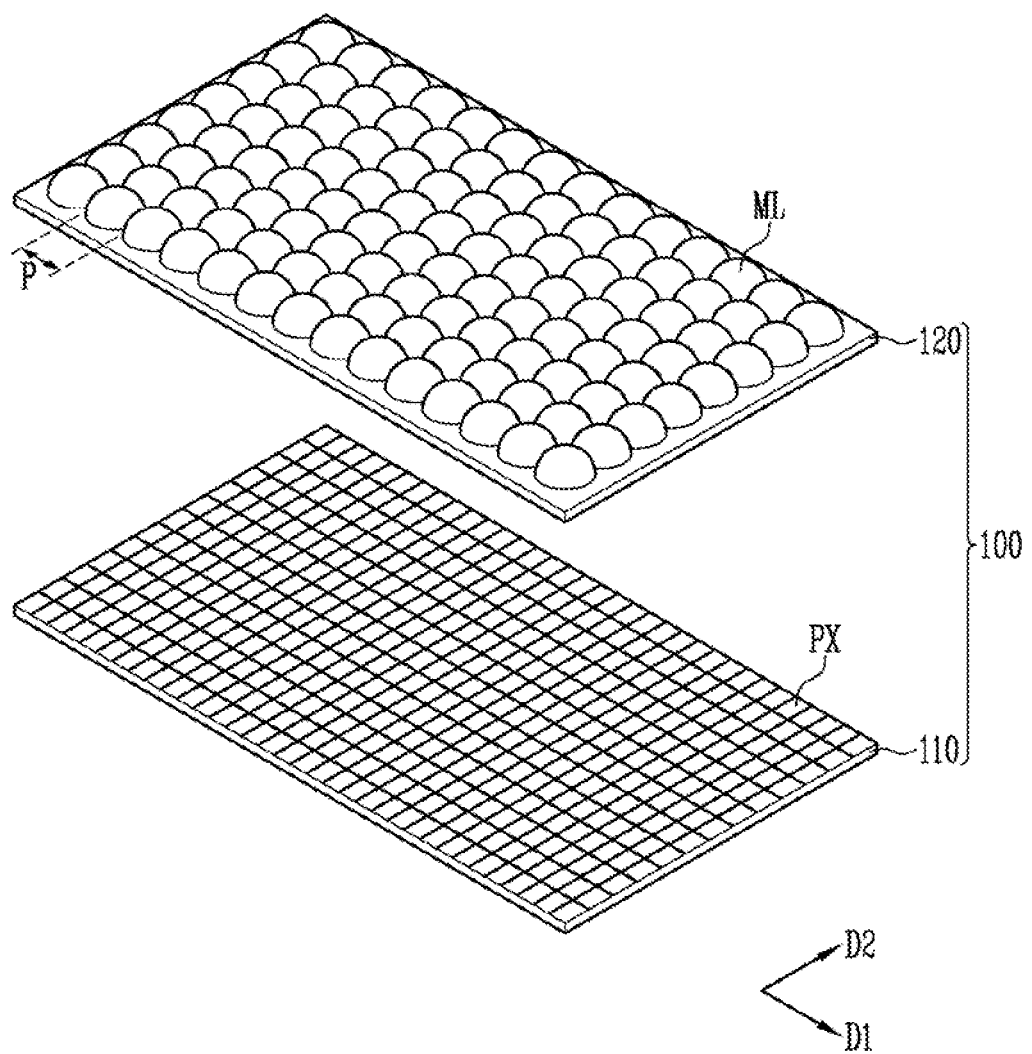
FIGS. 4A and 4B are exploded perspective views schematically illustrating a display module according to an embodiment of the present invention.
Figure 4B:
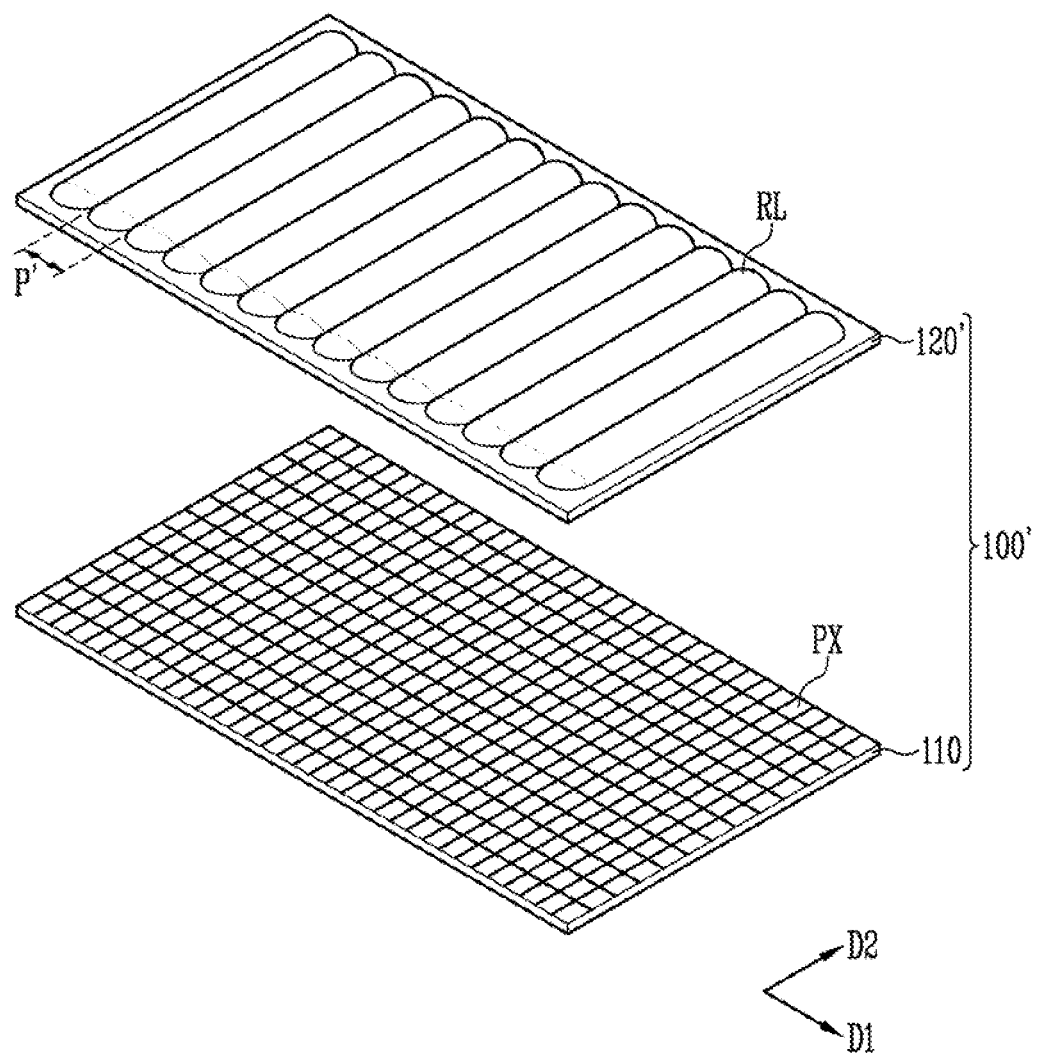

FIGS. 4A and 4B are exploded perspective views schematically illustrating the display module according to an embodiment of the present invention.

Referring to FIG. 4A, the display module 100 may include the display panel 110 and the micro lens array 120.

The display panel 110 may include a plurality of pixels PX. Each pixel may include, for example, a red pixel, a green pixel, and a blue pixel. The pixels PX may be arranged in a matrix form in a first direction D1 and a second direction D2 substantially perpendicular to the first direction D1. However, an arrangement state of the pixels PX is an example and the present invention is not limited thereto. For example, the pixels PX may have a pentile structure.

The micro lens array 120 is disposed on the display panel 110. The micro lens array 120 may include a plurality of micro lenses ML. Light generated from the pixels PX of the display panel 110 may pass through the micro lenses ML of the micro lens array 120 to form a light field.

The micro lens array 120 may be an active lens. For example, the micro lens array 120 may generate an electric field by a voltage applied to electrodes configuring the micro lens array, and thus an arrangement of liquid crystal molecules may be modified. In a two-dimensional display mode, the micro lens array 120 may cause an image displayed on the display panel 110 to be transmitted as it is, and in a three-dimensional display mode, the micro lens array 120 may separate a viewing area of the image on the display panel 110. For example, the micro lens array 120 operating in the three-dimensional display mode may cause a multi-view image displayed on the display panel 110 to be displayed in a corresponding viewing area for each viewpoint image by using diffraction and refraction phenomenon of light.

The arrangement of the pixels PX of the display panel 110 for forming the light field, the arrangement of the micro lenses ML configuring the micro lens array 120, and a relative position relationship between the pixels PX and the micro lenses ML are not limited to the embodiment shown in FIG. 4A and may be implemented in various embodiments within the spirit and scope of the present invention.

Image resolution (e.g., image quality) and a field of view have an inverse relationship. For example, as a pixel pitch P of the micro lens ML decreases, the image resolution increases but the field of view decreases, and as the pixel pitch P of the micro lens ML increases, the field of view increases but the image resolution decreases.

According to an embodiment of the present invention, to increase the image resolution, the pixel pitch P of the micro lens ML may be designed so that the field of view (or, e.g., a field of view of a basic field of view section MV) becomes about 6°.

In addition, referring to FIG. 4B, a display module 100' may include a display panel 110 and a lenticular lens array 120'.

The lenticular lens array 120' is disposed on the display panel 110. The lenticular lens array 120' may include a plurality of lenticular lenses RL. Light generated from the pixels PX of the display panel 110 may pass through the lenticular lenses RL of the lenticular lens array 120' to form a light field.

The lenticular lens array 120' may include a plurality of lenticular lenses RL arranged in one direction. Each lenticular lens RL may elongate in one direction (for example, the second direction DR2). A color arrangement of a pixel row corresponding to each lenticular lens RL and a color arrangement adjacent to each lenticular lens RL may be different from each other. For example, a primary color indicated by a first pixel PX of the pixel row corresponding to a lenticular lens RL may be different from that of an adjacent pixel PX corresponding to another lenticular lens RL. For example, an extension direction of each lenticular lens RL may be inclined at an acute angle with the second direction DR2, e.g., a column direction, or may be substantially parallel to the second direction DR2.

An arrangement of the pixels PX of the display panel 110' for forming the light field, an arrangement of the lenticular lenses RL configuring the lenticular lens array 120', and a relative position relationship between the pixels PX and the lenticular lenses RL are not limited to the embodiment shown in FIG. 4B and may be implemented in various embodiments within the spirit and scope of the present invention.

Image resolution (e.g., image quality) and a field of view may have an inverse relationship. For example, as a pixel pitch P' of the lenticular lens RL decreases, the image resolution increases but the field of view decreases, and as the pixel pitch P' of the lenticular lens RL increases, the field of view increases but the image resolution decreases.

According to an embodiment of the present invention, to increase the image resolution, the pixel pitch P' of the lenticular lens RL may be designed so that the field of view (or a field of view of a basic field of view section MV) becomes about 6°.

Hereinafter, for convenience of description, description is given based on the embodiment of the display module shown in FIG. 4A.

Figure 4C:
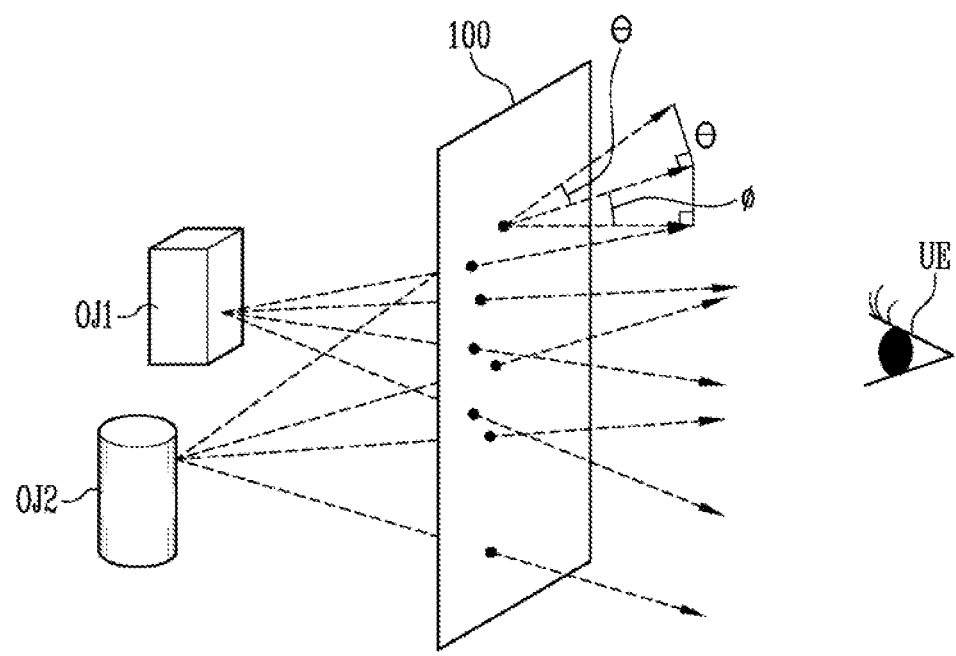
FIG. 4C is a diagram illustrating display of a stereoscopic image using the display module shown in FIG. 4A.

FIG. 4C is a diagram illustrating a display of a stereoscopic image using the display module shown in FIG. 4A.

Referring to FIG. 4C, the 'light field' is a concept expressing a state in which light is distributed in space through a distribution of rays. When this concept is used, light reflected or generated from an object moves straight through a space and enters an eye of a human, and a three-dimensional space may be configured of numerous light fields. In mathematically expressing individual light fields, for example, a five-dimensional Plenoptic function ($l(x, y, z, \theta, \varphi)$) may be used. For example, the light field may be expressed as a luminance for three-dimensional spatial coordinates (x, y, z) of a point, at which a light ray passes through a plane on a specific plane on a space, and a spatial direction angle ($\theta, \varphi$), at which the light ray is directed. The light field may be obtained (e.g., captured) by informationizing a Plenoptic function value of the light passing through the specific plane as described above. For example, the light field may be obtained by luminance values for each angle ($\theta, \varphi$) with respect to each of the coordinates (x, y, z) of a constant area. For example, image data may be provided to the display panel 110, and the direction of a light ray generated by the display panel 110 may form a light field directed in a specific direction (e.g., an observation viewpoint) by the micro lens array 120, and the user UE may view objects OJ1 and OJ2 as a three-dimensional image.

In FIGS. 4A and 4C, for convenience of description and as an example, the user UE directly views the three-dimensional image formed from the display module 100. However, as shown in FIGS. 1 and 2, the image, in which the three-dimensional image and the real image area combined, may be provided to the user UE using the optical combiner 200.

Figure 5:
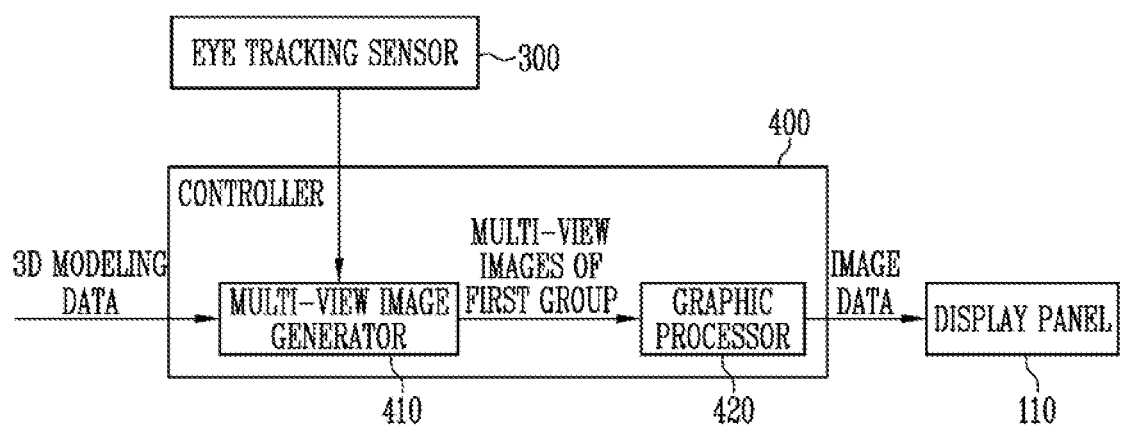
FIG. 5 is a block diagram schematically illustrating a controller of the light field display device according to an embodiment of the present invention.
Figure 6:
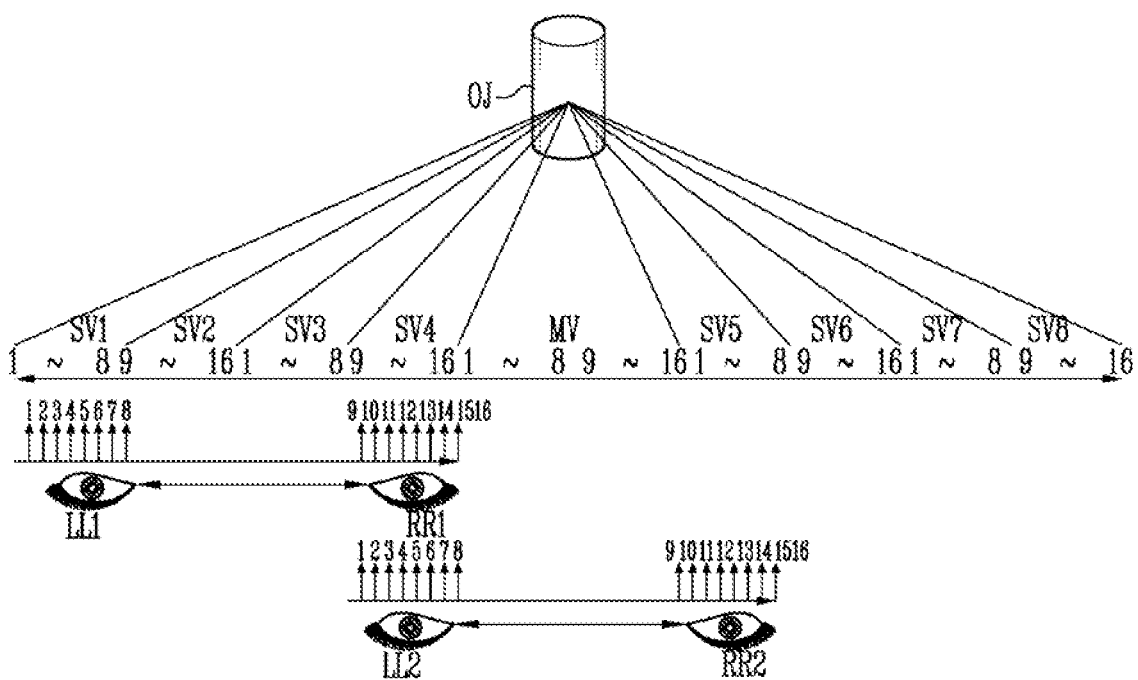
FIGS. 6 and 7 are diagrams illustrating changing a disposition of a plurality of virtual cameras according to a position of both eyes of a user detected by an eye tracking sensor.
Figure 7:
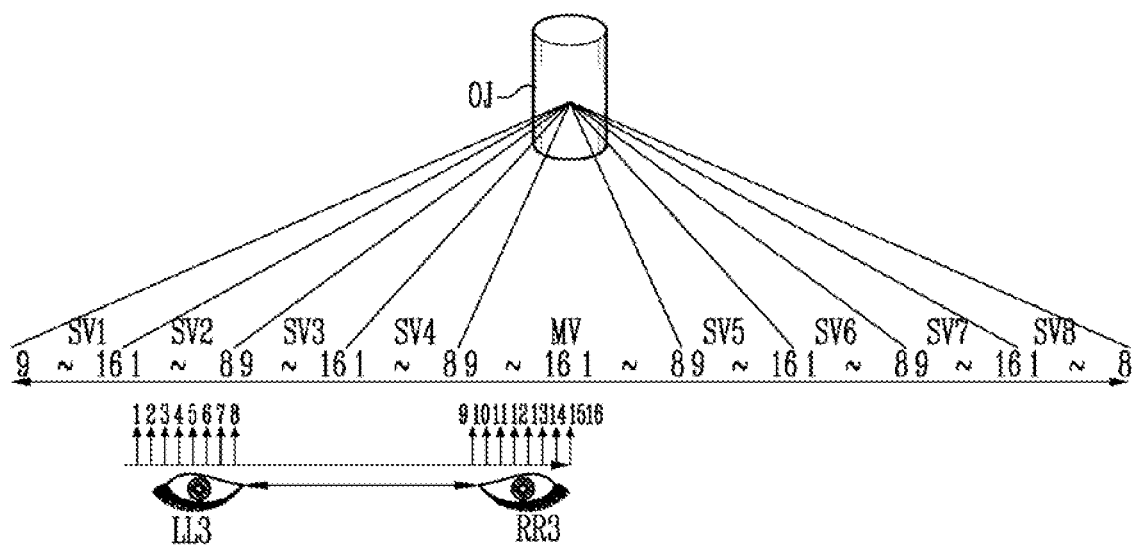

FIG. 5 is a block diagram schematically illustrating the controller of the light field display device according to an embodiment of the present invention. FIGS. 6 and 7 are diagrams illustrating changing a disposition of the plurality of virtual cameras according to the position of both eyes of the user detected by the eye tracking sensor.

According to an embodiment of the present invention, the controller 400 may include a multi-view image generator 410 and a graphic processor 420.

The multi-view image generator 410 may convert the 3D modeling data into first multi-view images. For example, the multi-view image generator 410 may include a multi-view virtual camera. At this time, the 3D modeling data may be provided from a memory included in the light field display device 1000. However, the present invention is not limited thereto, and the 3D image data may be provided from an external device. According to an embodiment of the present invention, the multi-view image generator 410 may be an application processor (AP), a central processing unit (CPU), or a microprocessor.

For example, the multi-view virtual camera may be implemented as an application. The multi-view virtual camera may include the plurality of virtual cameras, and the multi-view image generator 410 may convert the 3D image data into the first multi-view images based on setting information about a distance, an angle, and the like between the plurality of virtual cameras. At least two or more multi-view virtual cameras may be disposed to correspond to each of left and right eyes of the user UE.

The graphic processor 420 may output image data of one frame by mapping multi-view images to the plurality of pixels PX shown in FIG. 4A, respectively. The graphic processor 420 may perform a series of operations of rearranging an image having multi-view information in a pixel unit according to a light field viewpoint arrangement rule by a multi-view image mapping algorithm.

The graphic processor 420 may provide the image data to a driver of the display panel 110 shown in FIG. 4A. The display panel 110 (or, e.g., the display module 100) may display the three-dimensional image based on the received image data.

Referring to FIGS. 5 and 6, the multi-view image generator 410 may capture a three-dimensional object included in the first image OJ by using first to sixteenth virtual cameras to generate first to sixteenth multi-view images. The first to eighth multi-view images may be left viewpoint images corresponding to the left eye of the user UE, and the ninth to sixteenth multi-view images may be right viewpoint images corresponding to the right eye of the user UE. However, the number of virtual cameras is not limited thereto, and may vary in correspondence with the number of viewpoints and a viewpoint interval for displaying the first image OJ.

The graphic processor 420 may generate image data so that the first to sixteenth multi-view images are displayed in the basic field of view section MV, and may generate image data so that the first to sixteenth multi-view images are sequentially and repeatedly displayed in a plurality of sub field of view sections SV1 to SV8 disposed on left and right based on the basic field of view section MV. The basic field of view section MV may be about 6°, and a sub field of view SV may be about 3° corresponding to half of the basic field of view section MV. According to an embodiment of the present invention, a field of view of an expansion field of view section including the basic field of view section MV and the plurality of sub field of view sections SV1 to SV8 may be about 5 to about 10 times the field of view of the basic field of view section MV. For example, the number of the plurality of field of view sections may be 18.

For example, the graphic processor 420 may generate the image data so that the first to eighth multi-view images (or the left viewpoint images) are displayed in the first sub field of view section SV1, the third sub field of view section SV3, the fifth sub field of view section SV5, and the seventh sub field of view section SV7, and may generate the image data so that the ninth to sixteenth multi-view images (or the right viewpoint images) are displayed in the second sub field of view section SV2, the fourth sub field of view section SV4, the sixth sub field of view section SV6, and the eighth sub field of view section SV8.

However, when it is assumed that a distance between the left eye and the right eye of the user UE is about 62 mm, the field of view for viewing the three-dimensional image without occurrence of the inversion phenomenon is about 12°. Therefore, as shown in FIG. 6, when a position LL1 of the left eye of the user UE corresponds to the first sub field of view section SV1 and a position RR1 of the right eye of the user UE corresponds to the fourth sub field of view section SV4, the user UE may view a three-dimensional image of a high resolution since the left viewpoint images (or the first to eighth multi-view images) are displayed in the first sub field of view section SV1 and the right viewpoint images (or the ninth to sixteenth multi-view images) are displayed in the fourth sub field of view section SV4.

In addition, when the position of the left eye of the user UE corresponds to the fourth sub field of view section SV4 and the position of the right eye of the user UE corresponds to the fifth sub field of view section SV5, the user UE may feel dizzy due to the inversion phenomenon since the right viewpoint images (or the ninth to sixteenth multi-view images) are displayed in the fourth sub field of view section SV4 and the left viewpoint images (or the first to eighth multi-view images) are displayed in the fifth sub field of view section SV5. For example, as in the embodiment shown in FIG. 6, when the multi-view images displayed in the basic field of view section MV and the first to eighth sub field of view sections SV1 to SV8 are fixed, while the user UE may watch an image of a high resolution, there may be a problem in which the field of view is limited.

An embodiment of the present invention maintains the resolution of the image at a high level and increases the field of view of the user UE by using the eye tracking sensor 300 shown in FIG. 1.

According to an embodiment of the present invention, the eye tracking sensor 300 may generate a captured image by capturing the user UE in real time. The multi-view image generator 410 may receive position information of the left eye and the right eye of the user UE from the captured image. The multi-view image generator 410 may convert the 3D modeling data into multi-view images of a second group different from multi-view images of a first group by changing the position of the multi-view virtual cameras in correspondence with the position change of the left eye and the right eye of the user UE detected by the eye tracking sensor 300.

Referring to FIG. 7, a position LL3 of the left eye of the user UE corresponds to the second sub field of view section SV2, and a position RR3 of the right eye of the user UE corresponds to the basic field of view section MV. However, different from the embodiment shown in FIG. 6, the multi-view images displayed in each of the basic field of view section MV and the first to eighth sub field of view sections SV1 to SV8 are not fixed but are variable. For example, the multi-view image generator 410 may convert the existing multi-view images into new multi-view images by changing the position of the multi-view virtual cameras in correspondence with the change of the position LL3 of the left eye and/or the position RR3 of the right eye of the user UE detected by the eye tracking sensor 300.

For example, when the eye tracking sensor 300 detects that the position LL3 of the left eye of the user UE corresponds to the second sub field of view section SV2, the multi-view image generator 410 may dispose first to eighth multi-view virtual cameras to the second sub field of view section SV2, and may convert the multi-view images of the first group (i.e., the ninth to sixteenth multi-view images; refer to FIG. 6) into the multi-view images of the second group (i.e., the first to eighth multi-view images; refer to FIG. 7).

Thereafter, the graphic processor 420 may generate image data so that the first to sixteenth multi-view images are sequentially and repeatedly displayed based on the second sub field of view section SV2. For example, the graphic processor 420 may generate image data so that the ninth to sixteenth multi-view images (or the right viewpoint images) are displayed in the first sub field of view section SV1, the third sub field of view section SV3, the fifth sub field of view section SV5, and the seventh sub field of view section SV7, and may generate image data so that the first to eighth multi-view images (or the left viewpoint images) are displayed in the second sub field of view section SV2, the fourth sub field of view section SV4, the sixth sub field of view section SV6, and the eighth sub field of view section SV8.

Figure 8:
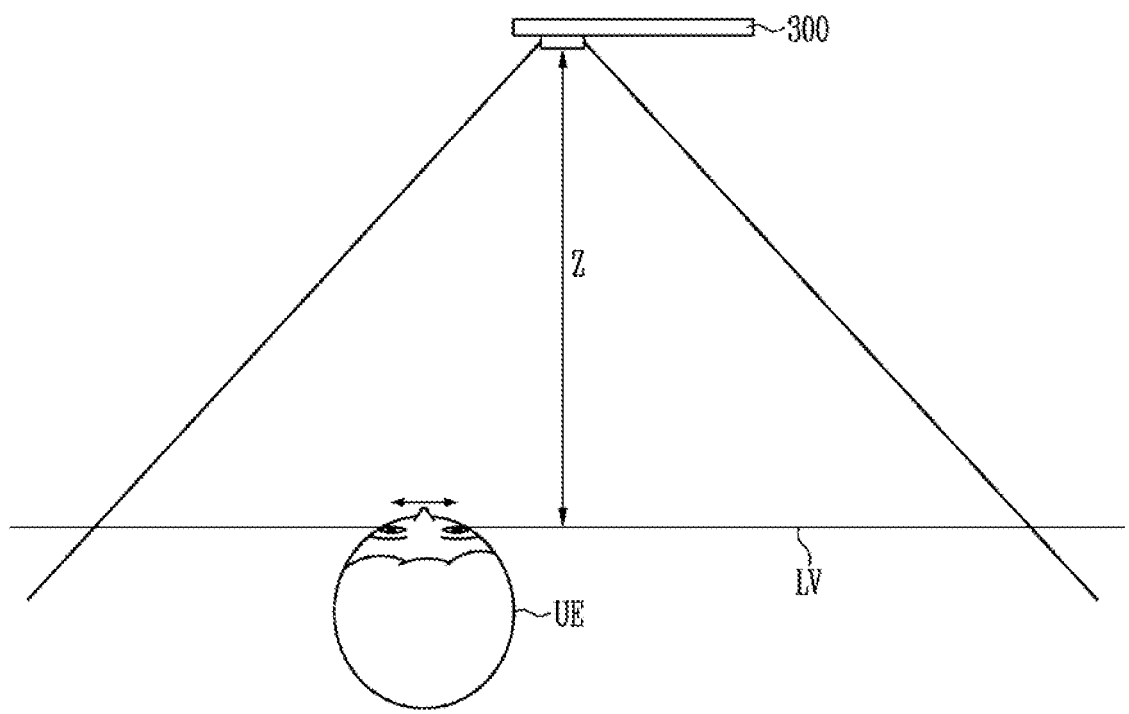
FIG. 8 is a diagram illustrating a calculation of coordinates of a left eye and a right eye of the user by using the eye tracking sensor.
Figure 9:
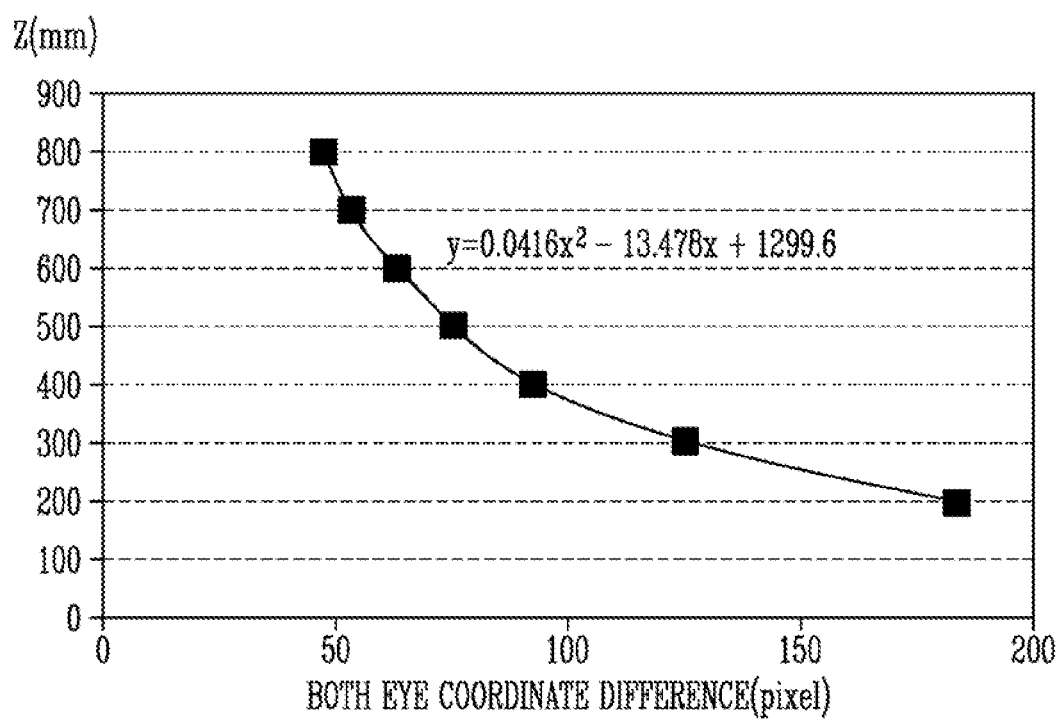
FIG. 9 is a graph illustrating a distance between the user and the eye tracking sensor.

FIG. 8 is a diagram illustrating a calculation of coordinates of the left eye and the right eye of the user by using the eye tracking sensor. FIG. 9 is a graph illustrating a distance between the user, corresponding to a coordinate difference between the left eye and the right eye of the user, and the eye tracking sensor.

Referring to FIGS. 8 and 9, according to an embodiment of the present invention, the multi-view image generator 410 may calculate a distance Z between the user UE and the eye tracking sensor 300, and may convert the 3D modeling data into second multi-view images different from first multi-view image by changing a distance between the multi-view virtual cameras in correspondence with the calculated distance Z. In addition, the distance Z between the user UE and the eye tracking sensor 300 may be the shortest distance from the eye tracking sensor 300 to a virtual straight line LV connecting the position of the left eye and the position of the right eye of the user UE.

The eye tracking sensor 300 may generate a captured image in real time by capturing the user UE. The multi-view image generator 410 may receive a difference in coordinates between coordinates of each eye of the user UE from the captured image. In addition, the coordinate difference between both eyes may be expressed in a unit of the pixel PX.

The graph shown in FIG. 9 is a Z-axis calibration function obtained by experimentally calculating the distance Z between the user UE and the eye tracking sensor 300 for each coordinate difference of both eyes of the user UE when the distance between both eyes of the user UE is about 62 mm. The Z-axis calibration function may be expressed by the following equation.

$$y=0.0416x^2-13.478x+1299.6 \quad \text{[Equation]}$$

(here, x is the coordinate difference of both eyes of the user UE, and y is the distance Z between the user UE and the eye tracking sensor 300.)

For example, in the captured image provided from the eye tracking sensor 300, when the coordinate difference of both eyes of the user UE is about 50 pixels, according to the Z-axis calibration function, the distance Z between the user UE and the eye tracking sensor 300 is about 800 mm.

In addition, as an example, the Z-axis calibration function is calculated under the assumption that the distance between both eyes of the user UE is about 62 mm, but the present invention is not limited thereto, and, for example, the Z-axis calibration function may be calculated for a different distance between both of the eyes of the user. The multi-view image generator 410 may directly obtain the distance between both of the eyes of the user UE by the eye tracking sensor 300 when the light field display device 1000 is initially driven, or may be obtained by an input of the user UE.

As described above, after the multi-view image generator 410 calculates the distance Z between the user UE and the eye tracking sensor 300 using the eye tracking sensor 300 and performs a calibration function, the multi-view image generator 410 may increase the distance between the multi-view virtual cameras or may decrease the distance between the multi-view virtual cameras. The multi-view image generator 410 may increase the distance between the multi-view virtual cameras when the distance Z between the user UE and the eye tracking sensor 300 increases. The multi-view image generator 410 may decrease the distance between the multi-view virtual cameras when the distance Z between the user UE and the eye tracking sensor 300 decreases.

Increasing the distance Z between the user UE and the eye tracking sensor 300 means that a distance between the user UE and the three-dimensional object included in the 3D modeling data is also increased, and decreasing the distance Z between the user UE and the eye tracking sensor 300 means that the distance between the user UE and the three-dimensional object included in the 3D modeling data is also decreased. Therefore, when the three-dimensional object is captured with the same number of virtual cameras and as the distance between the three-dimensional object and the user UE increases, a range to be captured by each of the virtual cameras increases. In addition, as the distance between the three-dimensional object and the user UE decreases, the range to be captured by each of the virtual cameras decreases. Therefore, the three-dimensional object may be displayed with a more three-dimensional effect.

Hereinafter, other embodiments of the present invention are described. In the following embodiment, a description of the same components as those of the previously described embodiment of the present invention may be omitted or simplified, and a difference is mainly described.

Figure 10:
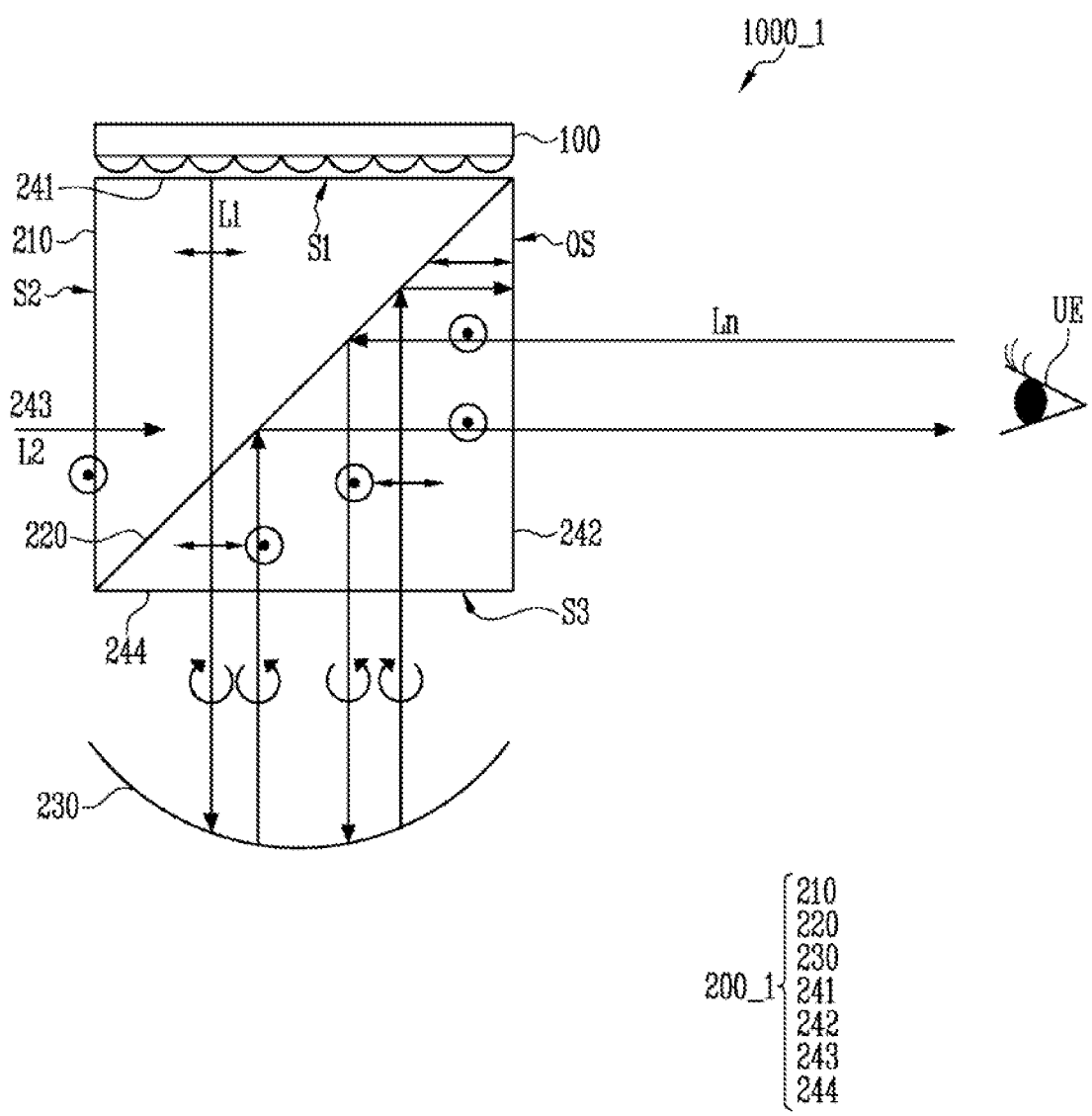
FIG. 10 is a schematic side view of a light field display device according to an embodiment of the present invention.

FIG. 10 is a schematic side view of a light field display device according to an embodiment of the present invention.

Referring to FIG. 10, the light field display device 10001 shown in FIG. 10 is different from the light field display device 1000 of FIG. 2 in that the light field display device 1000_1 further includes optical members that may prevent external light incident on the emission surface OS from being emitted to the emission surface OS again through the beam splitter 220 and the concave mirror 230, and the remaining configurations are substantially the same.

For example, the light field display device 1000_1 may include the display module 100 and an optical coupler 200_1 that couples first light L1 for a first image formed by the display module 100 and second light L2 for a second image from a path different from that of the first image.

The optical coupler 200I according to an embodiment of the present invention may include a first polarizing plate 241, a second polarizing plate 242, and a ¼ wave plate. The first polarizing plate 241 may be disposed on the first surface S1, and the second polarizing plate 242 may be disposed on the emission surface OS. The ¼ wave plate may be disposed between the third surface S3 and the concave mirror 230.

The first polarizing plate 241 may be disposed on the first surface S1 of the optical waveguide 210, and the second polarizing plate 242 may be disposed on the emission surface OS. The first polarizing plate 241 and the second polarizing plate 242 may have polarization axes substantially perpendicular to each other. For example, the first polarizing plate 241 may have a polarization axis that transmits light of a first polarization (↔), and the second polarizing plate 242 may have a polarization axis that transmits light of a second polarization (⊙). In addition, the ¼ wave plate 244 may be disposed between the third surface 244 of the optical waveguide 210 and the concave mirror 230.

The first light L1 for the first image incident on the first surface S1 by the first polarizing plate 241, the second polarizing plate 242, and the ¼ wave plate 244 may reach a view of the user UE. For example, the first light L1 passes through the first polarizing plate 241 and becomes light of the first polarization (++). Some of the light of the first polarization (↔) passes through the beam splitter 220, which is a half mirror, and passes through the ¼ wave plate 244. The light of the first polarization (↔) then becomes light of a circular polarization, and becomes light of a circular polarization of an opposite direction after being reflected by the concave mirror 230. Next, after being reflected by the concave mirror 230 and passing through the ¼ wave plate 244 again, the first light L1 becomes light of a second polarization (⊙), and is reflected by the beam splitter 220. The first light L1 then enters the second polarizing plate 242. Since the second polarizing plate 242 transmits only the light of the second polarization (⊙), the incident light of the second polarization (⊙) may be transmitted and may be transferred to the view of the user UE.

In addition, external noise light Ln incident on the emission surface OS may not reach the view of the user US due to the second polarizing plate 242 and the ¼ wave plate 244. For example, the noise light Ln passes through the second polarizing plate 242, becomes the light of the second polarization (⊙), and is reflected by the beam splitter 220. Then, the noise light Ln passes through the ¼ wave plate 244, and becomes light of a circular polarization of an opposite direction. The noise light Ln, with the circular polarization of an opposite direction, then becomes light of a circular polarization after being reflected by the concave mirror 230. Next, after being reflected by the concave mirror 230 and passing through the ¼ wave plate 244 again, the noise light Ln becomes the light of the first polarization (↔), and is reflected by the beam splitter 220. After being reflected by the beam splitter 220, the noise light Ln enters the second polarizing plate 242 as light of the first polarization (↔). Since the second polarizing plate 242 transmits only the light of the second polarization (⊙), the noise light Ln of the incident first polarized light (↔) is absorbed.

The optical coupler 2001 according to an embodiment of the present invention may further include a third polarizing plate 243 disposed on the second surface S2. The third polarizing plate 243 may have the same polarization axis as that of the second polarizing plate 242. For example, the third polarizing plate 243 may have a polarization axis that transmits the light of the second polarization (⊙). Accordingly, the second light L2 for the second image incident on the second surface S2 of the optical waveguide 210 may reach the view of the user UE. For example, the second light L2 passes through the third polarizing plate 243, and becomes light of the second polarization (⊙). Then, the second light L2 enters the second polarizing plate 242. Since the second polarizing plate 242 transmits only the light of the second polarization (⊙), the incident light of the second polarization (⊙) may be transmitted and may be transferred to the view of the user UE.

FIG. 11 is a flowchart illustrating a method of processing an image of the light field display device according to an embodiment of the present invention.

Referring to FIGS. 1 to 11, in the image processing method of the light field display device 1000, the 3D modeling data may be received by the multi-view image generator 410 (S10). According to an embodiment of the present invention, the light field display device 1000 may include a display module 100 and an eye tracking sensor 300 that tracks the position of the left eye and the right eye of the user UE. The display module 100 may include a plurality of pixels PX and may display a three-dimensional image according to image data.

In addition, the 3D image data may include coordinate information and depth information of the three-dimensional object included in the first image OJ.

The 3D image data may be provided from the memory included in the light field display device 1000. However, the present invention is not limited thereto, and for example, the 3D image data may be provided from an external device.

Next, the 3D modeling data may be converted into the first multi-view images by the multi-view virtual cameras (S20).

The multi-view virtual camera may be implemented as an application. The multi-view virtual camera may include the plurality of virtual cameras, and the multi-view image generator 410 may convert the 3D image data into the first multi-view images based on the setting information about the distance, the angle, and the like between the plurality of virtual cameras. For example, at least two or more multi-view virtual cameras may be assigned to each of the left eye and the right eye of the user UE.

Next, the image data may be output by mapping each of the first multi-view images to the plurality of pixels PX by the graphic processor 420 (S30).

For example, the graphic processor 420 may perform the series of operations of rearranging the image having the multi-view information in the pixel unit according to the light field viewpoint arrangement rule by the multi-view image mapping algorithm.

The graphic processor 420 may provide the image data to the driver of the display panel 110 shown in FIG. 4A. The display panel 110 (or, e.g., the display module 100) may display the three-dimensional image based on the received image data.

Next, the position of both of the eyes of the user UE may be detected by the eye tracking sensor (S40).

The eye tracking sensor 300 may generate the captured image by capturing the user UE in real time. The eye tracking sensor 300 may provide the captured image to the multi-view image generator 410 of the controller 400. For example, the eye tracking sensor 300 may use a web camera, a monocular camera, a stereo camera, a multi-camera, a camera capable of measuring depth information, or the like. The controller may calculate the position of the left eye and the right eye of the user from the captured image.

Next, the 3D modeling data may be converted into the multi-view images of the second group, different from the multi-view image of the first group, by changing the position of the multi-view virtual cameras in correspondence with the detected position change of both of the eyes of the user (S50).

The multi-view image generator 410 may receive the position information of the left eye and the right eye of the user UE from the captured image. The multi-view image generator 410 may convert the 3D modeling data into the multi-view images of the second group, different from the multi-view image of the first group, by changing the position of the multi-view virtual cameras in correspondence with the detected position change of the left eye and the right eye of the user UE detected by the eye tracking sensor 300.

Referring to FIG. 7, the position LL3 of the left eye of the user UE corresponds to the second sub field of view section SV2, and the position RR3 of the right eye of the user UE corresponds to the basic field of view section MV. However, different from the embodiment shown in FIG. 6, the multi-view images displayed in each of the basic field of view section MV and the first to eighth sub field of view sections SV1 to SV8 are not fixed but are variable. For example, the multi-view image generator 410 may convert the existing multi-view images for the 3D modeling data into the new multi-view images by changing the position of the multi-view virtual cameras in correspondence with the change of the position LL3 of the left eye and the position RR3 of the right eye of the user UE detected by the eye tracking sensor 300.

For example, when the eye tracking sensor 300 detects that the position LL3 of the left eye of the user UE corresponds to the second sub field of view section SV2, the multi-view image generator 410 may dispose the first to eighth multi-view virtual cameras to the second sub field of view section SV2, and may convert the multi-view images of the first group (i.e., the ninth to sixteenth multi-view images; refer to FIG. 6) into the multi-view images of the second group (i.e., the first to eighth multi-view images; refer to FIG. 7).

Thereafter, the graphic processor 420 may generate the image data so that the first to sixteenth multi-view images are sequentially and repeatedly displayed based on the second sub field of view section SV2. For example, the graphic processor 420 may generate the image data so that the ninth to sixteenth multi-view images (or the right viewpoint images) are displayed in the first sub field of view section SV1, the third sub field of view section SV3, the fifth sub field of view section SV5, and the seventh sub field of view section SV7. As an additional example, the graphic processor 420 may generate the image data so that the first to eighth multi-view images (or the left viewpoint images) are displayed in the second sub field of view section SV2, the fourth sub field of view section SV4, the sixth sub field of view section SV6, and the eighth sub field of view section SV8.

According to an embodiment of the present invention, the distance between the user UE and the eye tracking sensor 300 may be calculated, and the 3D modeling data may be converted into multi-view images of a third group different from the multi-view image of the second group by changing the distance between the multi-view virtual cameras according to the calculated distance.

While the present invention has been particularly shown and described with reference to exemplary embodiments thereof, it will be apparent those of ordinary skill in the art that various changes in form and detail may be made thereto without departing from spirit and scope of the present invention.

What is claimed is:

1. A light field display device comprising:
a display module;
an optical coupler configured to emit a third image obtained by combining a first image and a second image, and including a first surface, a second surface and an emission surface facing the second surface and emitting the third image, wherein the first image is emitted from the display module and is incident on the first surface, wherein the second image is emitted from a path different from a path of the first image, and wherein the second surface is disposed substantially perpendicular to the first surface and the second image is incident thereon; and
a controller configured to generate image data based on 3D modeling data and provide the image data to the display module,
wherein the optical coupler comprises:
an optical waveguide including the first surface, the second surface, the emission surface, and a third surface facing the first surface;
a beam splitter disposed in the optical waveguide; and
a concave mirror disposed adjacent to the third surface of the optical waveguide, and
wherein the controller dynamically adjusts and moves the concave mirror up and down with respect to the third surface in correspondence with depth information included in the 3D modeling data.

2. The light field display device of claim 1, wherein when a depth value included in the depth information is greater than a reference depth value, the controller moves the concave mirror downward from the third surface in correspondence with a difference between the depth value and the reference depth value.

3. The light field display device of claim 2, wherein the first image is displayed on the second surface when the depth value is the same as the reference depth value, and
wherein the first image is displayed in an area adjacent to the beam splitter when the 3D modeling data has the depth value greater than the reference depth value.

4. The light field display device of claim 1, wherein the beam splitter is a half mirror.

5. The light field display device of claim 1, further comprising:
a plurality of polarizing plates including:
a first polarizing plate disposed on the first surface; and
a second polarizing plate disposed on the emission surface and having a polarization axis substantially perpendicular to a polarization axis of the first polarizing plate.

6. The light field display device of claim 5, further comprising:
a ¼ wave plate disposed between the third surface and the concave mirror.

7. The light field display device of claim 5, further comprising:
a third polarizing plate disposed on the second surface and having a polarization axis substantially parallel to the polarization axis of the second polarizing plate.

8. The light field display device of claim 1, wherein the display module comprises:
a display panel including a plurality of pixels; and
a micro lens array disposed on the display panel and including a plurality of micro lenses.

9. The light field display device of claim 8, wherein a pitch of the plurality of micro lenses is designed so that a field of view of a basic field of view section becomes about 6°.

10. The light field display device of claim 9, further comprising:
an eye tracking sensor configured to track a position of both eyes of a user.

11. The light field display device of claim 10, wherein the controller comprises:
a multi-view image generator configured to convert the 3D modeling data into a multi-view image of a first group by multi-view virtual cameras; and
a graphic processor configured to map the multi-view image of the first group to the plurality of pixels.

12. The light field display device of claim 11, wherein at least two or more multi-view virtual cameras are disposed to correspond to each eye of the user.

13. The light field display device of claim 11, wherein a plurality of sub field of view sections are included on left and right sides of the basic field of view section, and each of the sub field of view sections has a field of view corresponding to half of the basic field of view section.

14. The light field display device of claim 13, wherein a field of view of an expansion field of view section including the basic field of view section and the plurality of sub field of view sections is about 5 to about 10 times the field of view of the basic field of view section.

15. The light field display device of claim 11, wherein the multi-view image generator converts the 3D modeling data into multi-view images of a second group different from the multi-view image of the first group by changing a position of the multi-view virtual cameras in correspondence with a position change of the both eyes of the user detected by the eye tracking sensor.

16. The light field display device of claim 11, wherein the multi-view image generator converts the 3D modeling data into multi-view images of a second group different from the multi-view image of the first group by calculating a distance between the user and the eye tracking sensor and by changing a distance between the multi-view virtual cameras in correspondence with the calculated distance.

17. The light field display device of claim 16, wherein when the calculated distance between the user and the eye tracking sensor increases, the multi-view image generator increases the distance between the multi-view virtual cameras, and
when the calculated distance between the user and the eye tracking sensor decreases, the multi-view image generator decreases the distance between the multi-view virtual cameras.

* * * * *